(12) United States Patent
Hagihara et al.

(10) Patent No.: US 9,580,568 B2
(45) Date of Patent: *Feb. 28, 2017

(54) FIBER-REINFORCED COMPOSITE MATERIAL

(71) Applicant: Teijin Limited, Osaka-shi, Osaka (JP)

(72) Inventors: Katsuyuki Hagihara, Matsuyama (JP); Yuhei Konagai, Matsuyama (JP); Naoaki Sonoda, Matsuyama (JP); Masatomo Teshima, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,935

(22) Filed: Oct. 14, 2013

(65) Prior Publication Data
US 2014/0039114 A1    Feb. 6, 2014

Related U.S. Application Data

(63) Continuation of application No. PCT/JP2011/070317, filed on Aug. 31, 2011.

(30) Foreign Application Priority Data

Apr. 14, 2011  (JP) ................. 2011-090218

(51) Int. Cl.
*C08K 3/04* (2006.01)
*B29C 43/22* (2006.01)
*C08J 5/04* (2006.01)

(52) U.S. Cl.
CPC .............. *C08K 3/04* (2013.01); *B29C 43/222* (2013.01); *C08J 5/042* (2013.01); *C08J 2300/22* (2013.01); *C08J 2377/02* (2013.01)

(58) Field of Classification Search
CPC ............. C08J 5/042; C08J 5/043; C08J 5/046
See application file for complete search history.

(56) References Cited

U.S. PATENT DOCUMENTS

| | | | | |
|---|---|---|---|---|
| 5,578,255 | A | * | 11/1996 | Okuyama ............... C04B 35/83 156/62.4 |
| 2006/0264544 | A1 | * | 11/2006 | Lustiger et al. .............. 524/284 |
| 2009/0004453 | A1 | | 1/2009 | Murai et al. |
| 2009/0061193 | A1 | * | 3/2009 | Hara et al. ..................... 428/220 |
| 2009/0104418 | A1 | | 4/2009 | Ohki et al. |
| 2011/0143110 | A1 | | 6/2011 | Tsuchiya et al. |
| 2012/0012263 | A1 | | 1/2012 | Tsuchiya et al. |

FOREIGN PATENT DOCUMENTS

| | | |
|---|---|---|
| EP | 483716 A1 * | 5/1992 |
| EP | 0483716 A1 | 5/1992 |
| JP | H04-163109 A | 6/1992 |
| JP | H11-172562 A | 6/1999 |
| JP | 2005-298790 A | 10/2005 |
| JP | 2006-291377 A | 10/2006 |
| JP | 2008-254191 A | 10/2008 |
| JP | 2008-308543 A | 12/2008 |
| JP | 2009-114611 A | 5/2009 |
| JP | 2009-114612 A | 5/2009 |
| JP | 2010-37358 | 2/2010 |
| JP | 2010-235779 A | 10/2010 |
| JP | 4789940 | 7/2011 |
| JP | 2011-178890 A | 9/2011 |
| JP | 2011-178891 A | 9/2011 |
| WO | 2007097436 A1 | 8/2007 |

OTHER PUBLICATIONS

Resin (Pitch); Wikipedia, Nov. 2009, downloaded Aug. 23, 2016.*
Jan. 8, 2015—(TW)—Office Action—App 100131293—concise explanation.
Jan. 22, 2015—(KR) Office Acction—App 10-2013-7026855—concise explanation.
May 12, 2014—(JP) Notification of Information Offer—App 2013509729.
May 13, 2014—(JP) Referential Material 1—App 2013509729.
Aug. 12, 2014—(JP) Notification of Reasons for Refusal—App 2013-509729—Eng Tran.
International Search Report received in International Application No. PCT/JP2011/070317 mailed Nov. 29, 2011.
Written Opinion received in International Appliction No. PCT/JP2011/070317 mailed Nov. 29, 2011.
Nov. 29, 2011—(PCT) Written Opinion—App PCT/JP2011/070317—Eng Tran.
Kitano, T. et al., "A Method for the Production of Randomly Oriented Fiber Reinforced Thermoplastic Composites and Their Mechanical Properties," Seiki-Kakou vol. 6, No. 12, 1994, pp. 905-915.
Mulligan, D.R. et al., "Fibre-bundling in a short-fibre composite: 1. Review of literature and development of a method for controlling the degree of bundling," Composite Science and Technology 63 (2003) 715-725.
Jan. 20, 2015—(JP) Notification of Information Offer—App 2013-509729—Eng Tran.
Mar. 10, 2015—(JP) Third Party Observation with Concise Statement—App 2013-509729—Eng Tran.
Nov. 10, 2015—(JP) Opposition with Concise Statement of Relevance—App 2015-700081.

* cited by examiner

*Primary Examiner* — Karuna P Reddy
(74) *Attorney, Agent, or Firm* — Banner & Witcoff, Ltd.

(57) ABSTRACT

There is provided a fiber-reinforced composite material is constituted by reinforcing fibers with an average fiber length of 5 mm to 100 mm and a thermoplastic resin, in which in a viscoelastic characteristic that is defined by following formulas (1) and (2), an average value in a range of −25° C. of the melting point of a matrix resin to +25° C. of the melting point of a matrix resin satisfies following formula (3):

$\tan \delta = G''/G'$  (1)

$\tan \delta' = Vf \times \tan \delta/(100-Vf)$  (2)

$0.01 \leq \tan \delta' \leq 0.2$  (3)

wherein G' represents a storage modulus (Pa) of the fiber-reinforced composite material, G" represents a loss modulus (Pa) of the fiber-reinforced composite material, and Vf represents a volume fraction (%) of the reinforcing fibers in the fiber-reinforced composite material.

7 Claims, 6 Drawing Sheets

FIBER-REINFORCED COMPOSITE MATERIAL

CROSS REFERENCE TO RELATED APPLICATION

This is a continuation of International Application No. PCT/JP2011/070317 filed on Aug. 31, 2011, and claims priority from Japanese Patent Application No. 2011-090218 filed on Apr. 14, 2011, the entire disclosures of which are incorporated herein by reference.

TECHNICAL FIELD

The present invention relates to a fiber-reinforced composite material constituted by reinforcing fibers and a thermoplastic resin, and which is thin-walled and excellent in mechanical properties and may provide an isotropic shaped product.

BACKGROUND ART

A fiber-reinforced composite material in which carbon fibers, aramid fibers, glass fibers or the like are used as reinforcing fibers has been widely utilized for structural materials of aircrafts, vehicles or the like, or in general industries and sports such as a tennis racket, a golf club shaft and a fishing rod by utilizing high specific strength and high specific elasticity thereof. The forms of reinforcing fibers used therein may include a woven fabric made by using continuous fibers, a UD sheet in which fibers are pulled and aligned unidirectionally, a random sheet made by using cut fibers, a non-woven fabric and the like.

Generally, in case of the fabric made from continuous fibers or the UD sheet and the like, complicated layering steps such as layering at various angles of, for example, 0/+45/−45/90, because of anisotropy of the fibers, or and further plane-symmetrical layering for preventing warpage of a shaped product. This is one of factors that increase the cost for the fiber-reinforced composite material.

Thus, by using an isotropic random mat in advance, a relatively inexpensive fiber-reinforced composite material may be obtained. The random mat may be obtained by a spray-up method (dry production method) wherein spraying cut reinforcing fibers alone or spraying the cut fibers together with a thermosetting resin are performed at the same time into a mold, or a paper-manufacturing method (wet method) of adding previously cut reinforcing fibers into an aqueous slurry containing a binder, followed by paper-making. The dry manufacturing method requires a relatively small device and thus allows the random mat to be obtained at a lower cost.

In the dry production method, a method of cutting continuous fibers and simultaneously spraying the cut fibers is frequently used, and a rotary cutter is used mostly. However, when an interval between blades of the cutter is widened in order to increase a fiber length, the cut frequency is decreased and thus results in discontinuous discharge of the fibers from the cutter. For this reason, unevenness in fiber areal weight of the fibers in the mat locally occurs. Especially, when a mat with a low fiber areal weight of fibers is made, there is a problem in that unevenness in thickness becomes significant and thus surface appearance is deteriorated.

Meanwhile, another factor that increases the cost for the fiber-reinforced composite material is that a long time is required for molding. In general, the fiber-reinforced composite material is obtained by heating and pressurizing a material called a prepreg by an autoclave for 2 hours or more, in which the prepreg is obtained by impregnating a reinforcing fiber base material with a thermosetting resin in advance. There has recently been suggested an RTM molding method in which a reinforcing fiber base material not impregnated with a resin is set in a mold, and a thermosetting resin is poured thereto. This significantly shortens a time for molding. However, even though the RTM molding method is adopted, a time required for molding one part is 10 minutes or more.

Therefore, a composite material employing a thermoplastic resin as a matrix, in place of conventional thermosetting resin, has been spotlighted. However, the thermoplastic resin generally has a higher viscosity than the thermosetting resin, and thus has a problem in that a time for impregnating a fiber base material with the molten resin is long, and as a result, a tact time until molding is prolonged.

As a method for solving the foregoing problems, there is suggested a method called thermoplastic stamping molding (TP-SMC). This is a molding method in which chopped fibers impregnated with a thermoplastic resin in advance are heated up to a melting point or more or a flowable temperature or more of the resin, and are put into a part of a mold, and immediately, the mold is closed. In the method, the fibers and the resin are allowed to flow in the mold so as to form a product shape, followed by cooling to form a shaped product. In the method, since the fibers impregnated with the resin in advance are used, it is possible to mold in a short time of about 1 minute. A method of manufacturing a chopped fiber bundle and a molding material is disclosed in Patent Documents 1 and 2. However, the disclosed method employs a molding material called an SMC or a stampable sheet. In such thermoplastic stamping molding, fibers and a resin are largely flowed within a mold, and thus fiber orientation is disturbed. In a case of a random mat employing cut fibers, lack of isotropy is caused due to unidirectional fiber orientation. As a result, a development rate of physical property of an isotropic composite material is lowered by unidirectional orientation caused by the flow of the resin and the reinforcing fibers. Also, in the molding within the mold accompanying the flow of the reinforcing fibers and the matrix resin, especially, a mold temperature or a mold structure has to be investigated in order to secure stability in a thickness direction and a planar dimension of a shaped product. Thus, there is a problem in that it is difficult to adjust manufacturing conditions in mass production, and also it is difficult to make a thin-walled product. Meanwhile, for the composite material employing the thermoplastic resin as a matrix, there is suggested a technique in which a long-fiber pellet that contains reinforcing fibers is injection-molded. However, the long-fiber pellet also has a limitation on the length of the pellet. Further, there is a problem in that the reinforcing fibers in the thermoplastic resin are cut by kneading and thus the length of the reinforcing fibers may not be kept. Also, the molding method through such injection molding has a problem in that the reinforcing fibers are oriented, and thus isotropy may not be achieved.

Also, as a means for a thin-walled product without flow of fibers, there is suggested a method of manufacturing a prepreg in which a thin sheet is manufactured from reinforcing fibers through a paper-making method, and then the thin sheet is impregnated with a resin (Patent Document 3). In the paper-making method, since reinforcing fibers are uniformly dispersed in a dispersion liquid, the reinforcing fibers are in single fiber form.

(Patent Document 1) Japanese Patent Laid-Open Publication No. 2009-114611
(Patent Document 2) Japanese Patent Laid-Open Publication No. 2009-114612
(Patent Document 3) Japanese Patent Laid-Open Publication No. 2010-235779

SUMMARY OF INVENTION

Problems to be Solved

An object of the present inveng5tion is to provide a fiber-reinforced composite material constituted by reinforcing fibers and a thermoplastic resin, which is thin-walled and excellent in mechanical properties and may provide an isotropic shaped product. Further, in the fiber-reinforced composite material of the present invention, the fiber-reinforced composite material has a particular viscoelastic characteristic, and thus the reinforcing fibers and the matrix resin may be flowed at a predetermined level within a mold so that a shaped product may be dimensionally accurately obtained.

Means for Solving the Problems

In order to obtain an isotropic shaped product which is thin-walled and excellent in mechanical properties, extensive studies have been made. As a result, it has been found that when a fiber-reinforced composite material has a particular viscoelastic characteristic, a thermoplastic matrix resin may be easily impregnated, and the matrix resin and reinforcing fibers are allowed to be flowed at a predetermined level so that unidirectional orientation of the reinforcing fibers may be suppressed during molding. The present invention has been made based on these findings. That is, the fiber-reinforced composite material of the present invention constituted by reinforcing fibers with an average fiber length of 5 mm to 100 mm and a thermoplastic resin, in which in tan δ' that exhibits a viscoelastic characteristic as defined by following formulas (1) and (2), an average value of tan δ' in a range of −25° C. of the melting point of a matrix resin to +25° C. of the melting point of a matrix resin satisfies following formula (3).

$$\tan \delta = G''/G' \quad (1)$$

$$\tan \delta' = Vf \times \tan \delta / (100 - Vf) \quad (2)$$

$$0.01 \leq \tan \delta' \leq 0.2 \quad (3)$$

(wherein, G' represents a storage modulus (Pa) of the fiber-reinforced composite material, G'' represents a loss modulus (Pa) of the fiber-reinforced composite material, and Vf represents a volume fraction (%) of the reinforcing fibers in the fiber-reinforced composite material)

The fiber-reinforced composite material may be preferably obtained by molding a random mat in which reinforcing fibers included in the composite material have a specific opening degree. In the random mat that has the reinforcing fibers having a specific opening degree, a ratio of reinforcing fiber bundles (A) constituted by the reinforcing fibers of a critical single fiber number or more defined by formula (4) with respect to a total amount of the reinforcing fibers in the mat is 20 Vol % or more and less than 90 Vol %, and an average number of fibers (N) in the reinforcing fiber bundles (A) satisfies following formula (5).

$$\text{Critical single fiber number} = 600/D \quad (4)$$

$$0.7 \times 10^4 / D^2 < N < 1 \times 10^5 / D^2 \quad (5)$$

(wherein D represents an average fiber diameter (μm) of single reinforcing fibers)

Effect of Invention

Through the fiber-reinforced composite material of the present invention, a shaped product excellent in a surface appearance may be provided with high dimensional accuracy. Here, high dimensional accuracy indicates that the shaped product may be formed with a required thickness, and the shaped article may be produced according to a mold shape. Especially, the thickness dimension of the shaped product is highly influential on material properties such as tensile strength or bending strength, and finally becomes a critical factor that determines whether the shaped product as a structure body may allow a product in accordance with designed values to be manufactured. Thus, an effect that a shaped product in accordance with designed valued may be obtained by using the fiber-reinforced composite material of the present invention is large.

Also, when the fiber-reinforced composite material of the present invention is used for molding, a shaped article may be thinned and isotropic, and shape follow-up property into a complicated three-dimensional shape may be secured. The fiber-reinforced composite material of the present invention may be used as a preform for various kinds of structural members, for example, an inner plate, an outer plate, and constructional elements of a vehicle, various electrical products, a frame or a housing of a machine.

BEST MODE FOR CARRYING OUT THE INVENTION

Figure 1:
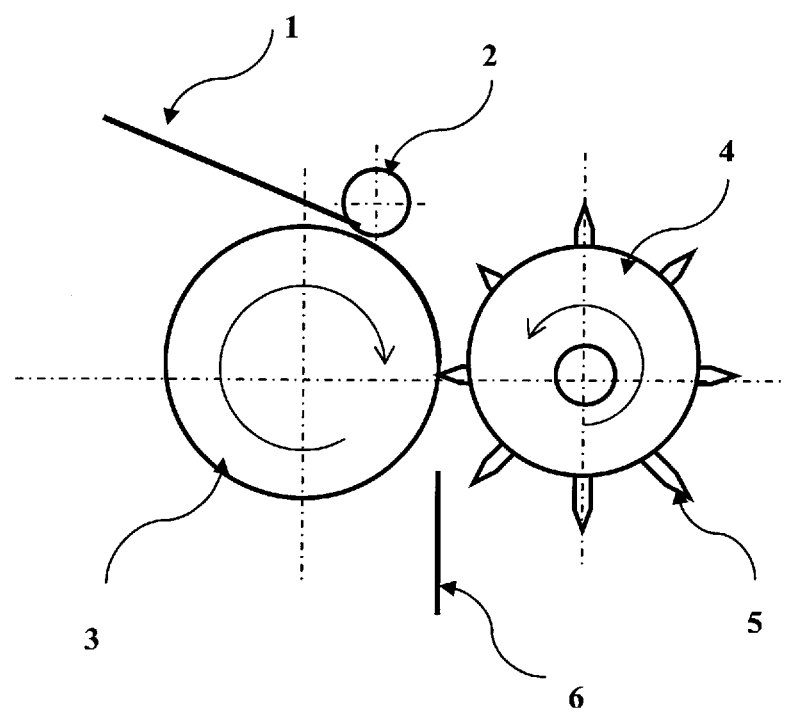
FIG. 1 is a schematic view illustrating a step for cutting a fiber bundle.

Hereinafter, the exemplary embodiments of the present invention will be sequentially described.

[Fiber-Reinforced Composite Material]

A fiber-reinforced composite material of the present invention is constituted by reinforcing fibers with an average fiber length of 5 mm to 100 mm and a thermoplastic resin, in which an elastic component is substantially dominant in the deformation characteristic of the composite material.

The fiber-reinforced composite material of the present invention is characterized in that in tan δ' that exhibits a viscoelastic characteristic as defined by following formulas (1) and (2), an average value of tan δ' in a range of −25° C. of the melting point of a matrix resin to +25° C. of the melting point of the matrix resin satisfies formula (3).

$$\tan \delta = G''/G' \quad (1)$$

$$\tan \delta' = Vf \times \tan \delta / (100 - Vf) \quad (2)$$

$$0.01 \leq \tan \delta' \leq 0.2 \quad (3)$$

(wherein G' represents a storage modulus (Pa) of the fiber-reinforced composite material, G" represents a loss modulus (Pa) of the fiber-reinforced composite material, and Vf represents a volume fraction (%) of reinforcing fibers in the fiber-reinforced composite material)

Here, "the elastic component is substantially dominant in the deformation characteristic of the composite material" indicates that in the thermal deformation of the composite material, a dimensionless value of G"/G' by a volume fraction of the reinforcing fibers included in the composite material is not greater than 0.2, in which G" indicates a viscous component dominating a flow characteristic of a material, that is, a loss modulus of the composite material, and G' indicates a component dominating a shape retention characteristic of a material, that is, a storage modulus of the composite material.

[Reinforcing Fibers in Fiber-Reinforced Composite Material]

The fiber-reinforced composite material of the present invention is characterized in that it includes reinforcing fibers which are long to some extent, and thus may exhibit a reinforcing function. The fiber length of the reinforcing fibers is represented by an average fiber length which is obtained by measuring a fiber length of the reinforcing fibers in the fiber-reinforced composite material. There may be a method of measuring the average fiber length, in which after a resin is removed within a furnace at 500° C. for about 1 hour, fiber lengths of randomly extracted 100 fibers are measured to a unit of 1 mm by using a vernier caliper or a loupe, and the average thereof is obtained.

In the fiber-reinforced composite material of the present invention, the average fiber length of the reinforcing fibers ranges from 5 mm to 100 mm, preferably from 10 mm to 100 mm, more preferably from 15 mm to 100 mm, and further more preferably from 15 mm to 80 mm. Further, a range from 20 mm to 60 mm is preferred.

In a preferred example of manufacturing the composite material as described later, when the reinforcing fibers are cut into a fixed length to manufacture a random mat, the average fiber length of the reinforcing fibers in the random mat and the composite material is almost the same as the cut fiber length.

The composite material is useful as a prepreg for molding, and its density may be variously selected according to a required shaped product. The fiber areal weight of the reinforcing fibers in the composite material preferably ranges from 25 g/m$^2$ to 4500 g/m$^2$.

Preferably, in the reinforcing fibers in the fiber-reinforced composite material, there exist reinforcing fiber bundles (A) constituted by the reinforcing fibers of a critical single fiber number or more defined by formula (4), reinforcing fibers in the single form, and fiber bundles having a single fiber number less than the critical single fiber number.

$$\text{Critical single fiber number} = 600/D \quad (4)$$

(wherein D represents an average fiber diameter (μm) of single reinforcing fibers)

In the reinforcing fibers in the fiber-reinforced composite material, the ratio of the reinforcing fiber bundles (A) with respect to the total amount of fibers in the fiber-reinforced composite material is preferably 20 Vol % or more and less than 90 Vol %. The ratio is more preferably 30 Vol % or more and less than 90 Vol %.

In the reinforcing fibers in the fiber-reinforced composite material, the average number of fibers (N) in the reinforcing fiber bundles (A) preferably satisfies the following formula (5).

$$0.7 \times 10^4/D^2 < N < 1 \times 10^5/D^2 \quad (5)$$

(wherein D represents an average fiber diameter (μm) of single reinforcing fibers)

Specifically, the average number of fibers (N) in the reinforcing fiber bundles (A) constituted by the reinforcing fibers of the critical single fiber number or more is preferably less than $6 \times 10^4/D^2$.

The fiber-reinforced composite material may be preferably manufactured by press-molding a random mat that includes reinforcing fibers and a thermoplastic resin. The opening degree of the reinforcing fibers in the fiber-reinforced composite material is substantially maintained in the random mat. In the reinforcing fibers in the fiber-reinforced composite material, the ratio of the reinforcing fiber bundles (A), and the average number of fibers (N) in the reinforcing fiber bundles (A) may be preferably adjusted to be within the foregoing range by controlling the ratio of the reinforcing fiber bundles (A) in the random mat, and the average number of fibers (N) in the reinforcing fiber bundles (A) in the random mat. A preferred method of controlling the ratio of the reinforcing fiber bundles (A) in the random mat, and the average number of fibers will be described later.

The reinforcing fiber that constitutes the fiber-reinforced composite material is preferably at least one kind selected from the group consisting of a carbon fiber, an aramid fiber and a glass fiber. They may be used in combination. Among them, the carbon fiber is preferred from the viewpoint of providing a composite material that is lightweight and excellent in strength. In a case of the carbon fiber, the average fiber diameter preferably ranges from 3 μm to 12 μm, and more preferably from 5 μm to 7 μm.

As for the reinforcing fibers, fibers added with a sizing agent are preferably used. The sizing agent is preferably used in an amount of greater than 0 parts to 10 parts by weight based on 100 parts by weight of the reinforcing fibers.

[Thermoplastic Resin in Fiber-Reinforced Composite Material]

There is no specific limitation on the kind of the thermoplastic resin that constitutes the fiber-reinforced composite material, and examples thereof may include a vinyl chloride resin, a vinylidene chloride resin, a vinyl acetate resin, a polyvinyl alcohol resin, a polystyrene resin, an acrylonitrile-styrene resin (AS resin), an acrylonitrile-butadiene-styrene resin (ABS resin), an acrylic resin, a methacrylic resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene terephthalate resin, a polybutylene naphthalate resin, a polyarylate resin, a polyphenylene ether resin, a polyphenylene sulfide resin, a polysulfone resin, a polyethersulfone resin, a polyetherether ketone resin, a polylactic resin and so on. Among them, at least one kind selected from the group consisting of a polyamide 6 resin, and a polypropylene resin is preferred. These thermoplastic resins may be used alone or in combination of two or more thereof.

The thermoplastic resin exists in the fiber-reinforced composite material in an amount of preferably 50 parts to 1,000 parts by weight based on 100 parts by weight of the reinforcing fibers. More preferably, the thermoplastic resin exists in an amount of 55 parts to 500 parts by weight based on 100 parts by weight of the reinforcing fibers, and further more preferably, the thermoplastic resin exists in an amount of 60 parts to 300 parts by weight based on 100 parts by weight of the reinforcing fibers.

In the fiber-reinforced composite material, the reinforcing fiber volume fraction (Vf) defined by the following formula (7) preferably ranges from 5% to 80%.

$$\text{Reinforcing fiber volume fraction } (Vf)=100\times \text{volume of reinforcing fiber}/(\text{volume of reinforcing fibers}+\text{volume of thermoplastic resin}) \quad (7)$$

The reinforcing fiber volume fraction (Vf) represents a composition of the reinforcing fibers and the thermoplastic resin included in the fiber-reinforced composite material, that is, a shaped product formed by the fiber-reinforced composite material. When the reinforcing fiber volume fraction is lower than 5%, a reinforcing effect may not be sufficiently exhibited. Also, when the content is greater than 80%, there is a possibility that a void may be easily generated in the fiber-reinforced composite material, and the physical property of the shaped product may be deteriorated. It is more preferred that the reinforcing fiber volume fraction ranges from 20% to 60%.

In an example of a specific method of calculating the forgoing reinforcing fiber volume fraction (Vf), mass values of reinforcing fibers and a thermoplastic resin are obtained by removing the thermoplastic resin from a specimen of a shaped product, and converted into volumes by using densities of the respective components, and the volume values are substituted in the formula above.

As for a method of removing the thermoplastic resin from the shaped product specimen, a method using combustion (thermal decomposition) removal may be simply and preferably used when the reinforcing fibers are inorganic fibers such as carbon fibers or glass fibers. In this case, a mass of a sufficiently dried specimen of a shaped product is weighed, and then is treated using an electric furnace or the like at 500° C. to 700° C. for 5 to 60 minutes so as to combust the thermoplastic resin component. The remaining reinforcing fibers after the combustion are left cool in a dry atmosphere, and weighed so as to calculate masses of the respective components.

As for a method of removing the thermoplastic resin from the shaped product specimen, there is another preferred method in which a chemical material capable of easily decomposing or dissolving the thermoplastic resin is used so that the thermoplastic resin may be removed through decomposition or dissolution. Specifically, the mass of a shaped product specimen formed into a thin piece having an area of 1 cm² to 10 cm² is weighed, and then a chemical material capable of dissolving or decomposing the thermoplastic resin may be used to extract a component dissolved therein. Then, the residue is washed and dried, and then weighed so as to calculate masses of respective components. For example, in a case where the thermoplastic resin is polypropylene, the polypropylene may be dissolved using heated toluene or xylene. In a case where the thermoplastic resin is polyamide, the polyamide may be decomposed using heated formic acid. When the resin is polycarbonate, the polycarbonate may be dissolved using heated chlorinated hydrocarbon.

When the fiber-reinforced composite material is obtained form a random mat, the ratio of the supply amount (based on mass) of the reinforcing fiber content to the resin content in manufacturing the random mat may be considered as the mass ratio of the reinforcing fiber content to the resin content in the random mat.

[Other Agents]

The fiber-reinforced composite material of the present invention may include various kinds of fibrous or non-fibrous fillers made from an organic fiber or an inorganic fiber, or additives such as a flame retardant, an anti-UV agent, a pigment, a releasing agent, a softening agent, a plasticizer or a surfactant within a limitation that does not impair the object of the present invention.

[Flow Characteristic of Fiber-Reinforced Composite Material]

In a heating step within a mold at the time of molding, restraint of a material within a flow range at a predetermined level has a preferable influence on retaining the development rate of physical property of reinforcing-fiber of anisotropic material and the product dimension accuracy. The fiber-reinforced composite material of the present invention is characterized in which in tan δ' that exhibits a viscoelastic characteristic as defined by formulas (1) and (2), an average value of tan δ' in a range of −25° C. of the melting point of a matrix resin to +25° C. of the melting point of a matrix resin satisfies the following formula (3).

$$\tan \delta' = G''/G' \quad (1)$$

$$\tan \delta' = Vf \times \tan \delta/(100-Vf) \quad (2)$$

(wherein G' represents a storage modulus (Pa) of the fiber-reinforced composite material, G" represents a loss modulus (Pa) of the fiber-reinforced composite material, and Vf represents a volume fraction (%) of the reinforcing fibers in the fiber-reinforced composite material).

$$0.01 \leq \tan \delta' \leq 0.2 \quad (3)$$

Here, G' represents an elastic component of a material, and G" represents a viscous component. In material properties having both of the viscous component and the elastic component, tan δ represents a behavior when a material is deformed by a strain, and represents which one of the viscous component and the elastic component appears as a dominant behavior, as a ratio of the viscous component and the elastic component. As the viscous effect is larger, tan δ has a larger value. The fiber-reinforced composite material of the present invention is characterized in that in a range of −25° C. of the melting point of a matrix resin to +25° C. of the melting point of the matrix resin, tan δ' that exhibits a viscoelastic characteristic is substantially fixed. Further, the fiber-reinforced composite material of the present invention preferably satisfies the formula (3) even in a range of −25° C. of the melting point of a matrix resin to +35° C. of the melting point of the matrix resin.

When tan δ' is less than 0.01, the storage modulus G' of the fiber-reinforced composite material is relatively higher with respect to the loss modulus G", and the material becomes a rigid material in which the reinforcing fibers and the matrix resin never flow at the time of heating. Thus, at the time of heating in a press-molding step, follow-up property in mold of the material is impaired, and thus it is difficult to obtain a predetermined product shape. Meanwhile, when tan δ' is a value greater than 0.2, the effect of the storage modulus G' is relatively lowered with respect to the loss modulus G", and the material allows the reinforcing fibers and the matrix resin to easily flow at the time of heating. Thus, a significant unidirectional orientation of the reinforcing fibers is generated. When the value of tan δ' ranges from 0.01 to 0.2, it is possible to secure shape follow-up property into a complicated three-dimensional shape by slightly flowing the material in a range capable of securing a product dimension in accordance with a final shape of a composite material product.

The average value of tan δ' in a range of −25° C. of the melting point of a matrix resin to +25° C. of the melting point of the matrix resin more preferably ranges from 0.02 to 0.15.

Figure 4:
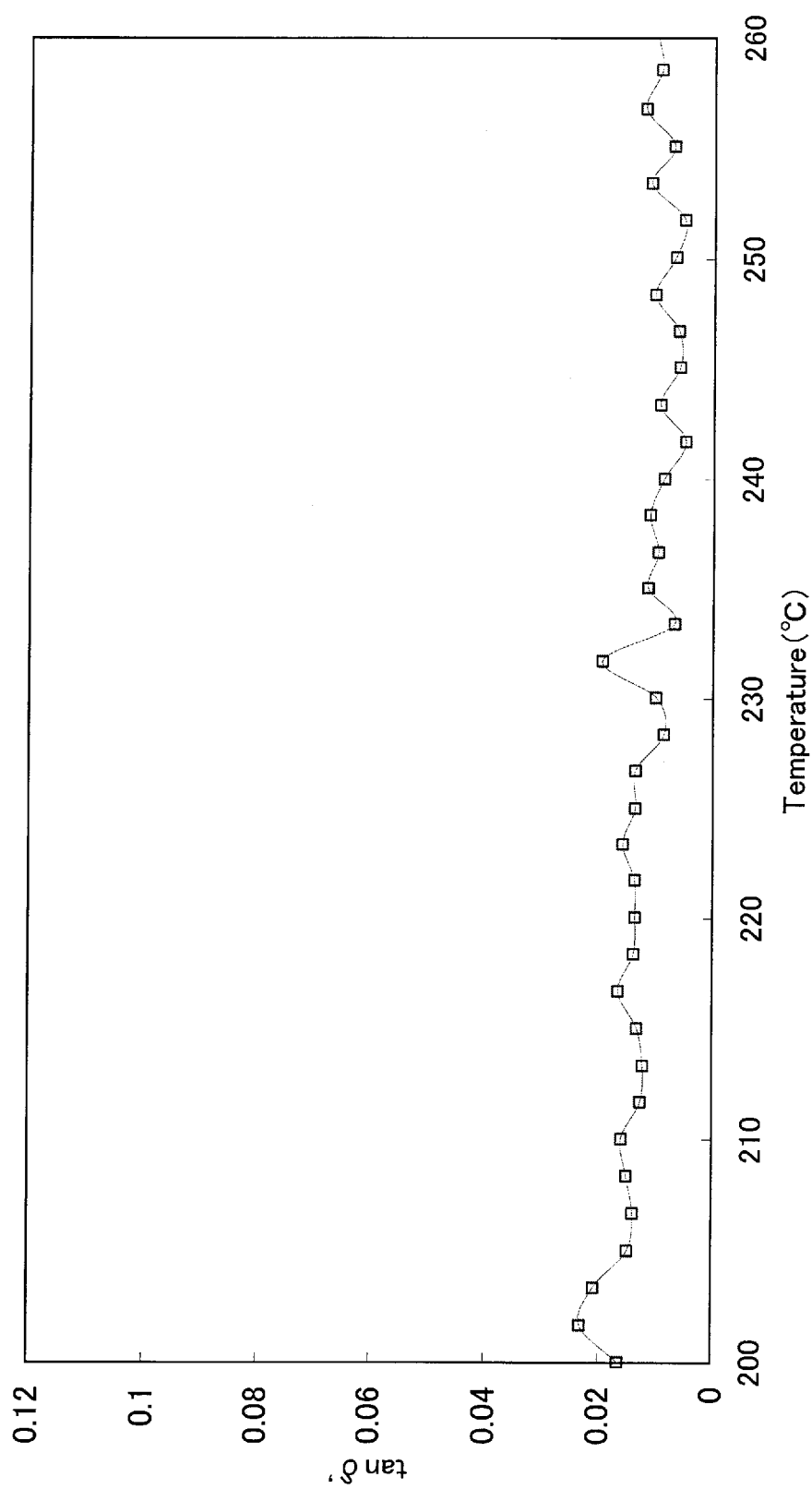
FIG. 4 shows measurement results of tan δ' in a fiber-reinforced composite material of Example 1.
Figure 5:
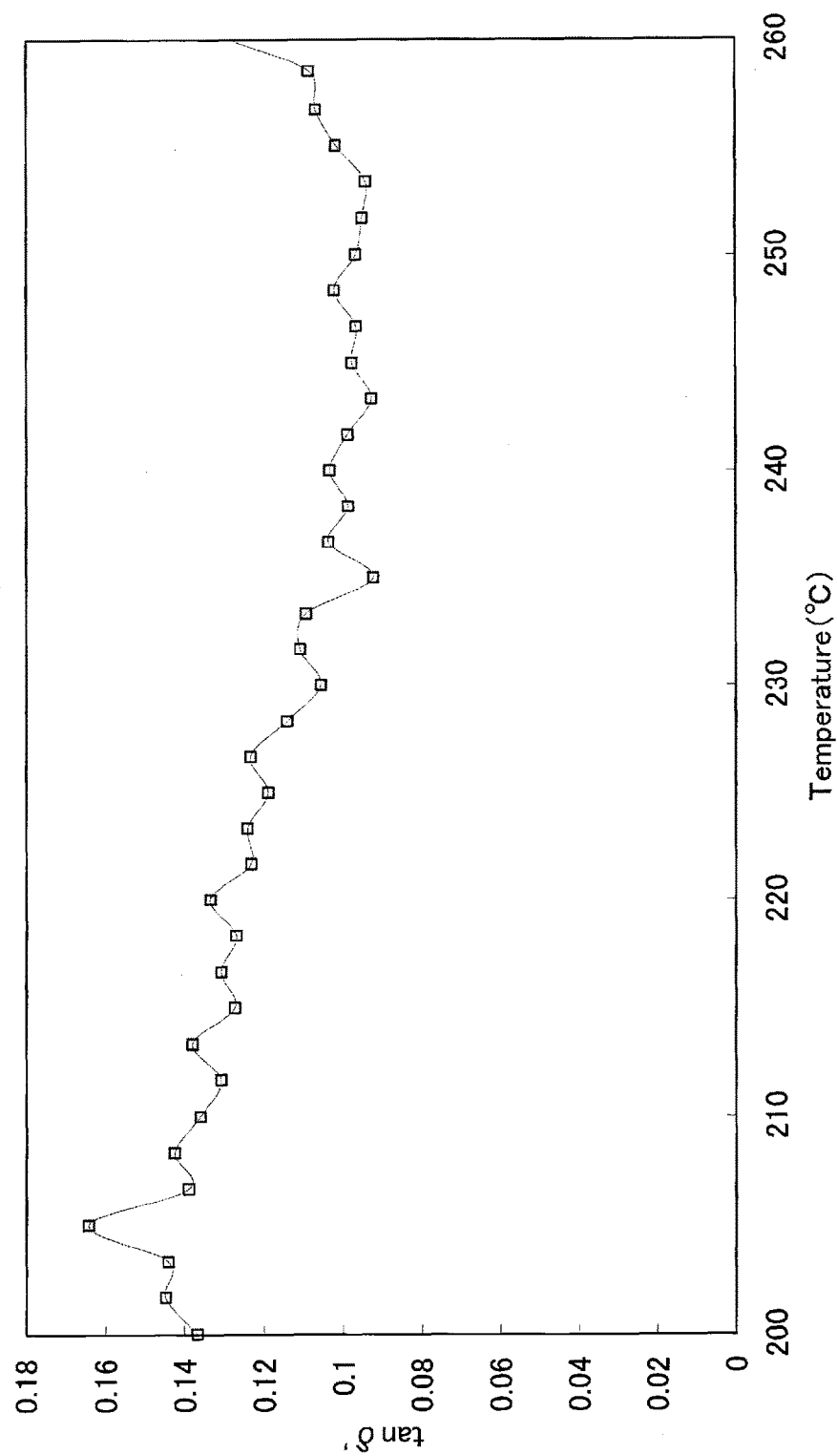
FIG. 5 shows measurement results of tan δ' in a fiber-reinforced composite material of Example 2.

FIGS. 4 and 5 show measurement results of tan δ' exhibiting a viscoelastic characteristic in an example of the fiber-reinforced composite material of the present invention, in which the fiber-reinforced composite material includes polyamide as a matrix, and carbon fibers as reinforcing fibers, and a volume fraction of the carbon fibers is 30%. FIG. 4 shows measurement results of the viscoelastic characteristic (that is, tan δ') of a fiber-reinforced composite material obtained from a random mat in which the ratio of reinforcing fiber bundles (A) constituted by the reinforcing fibers of a critical single fiber number or more defined by formula (4) is 30 Vol % or more with respect to the total amount of fibers in the mat. FIG. 5 shows measurement results of the visco elastic characteristic (tan δ') of a fiber-reinforced composite material obtained form a random mat in which the ratio of reinforcing fiber bundles (A) is 70%. The horizontal axis indicates the range of a heating temperature around the melting point (Tm) of the matrix resin (in this example, the melting point of the matrix resin is 225° C., and the measurement temperature ranges from 200° C. to 260° C.). The vertical axis indicates the values of tan δ' of the fiber-reinforced composite material. As can be seen from this, when the ratio of the reinforcing fiber bundles (A) constituted by the reinforcing fibers of the critical single fiber number or more is 30% or 70%, the fiber-reinforced composite material obtained from the random mat including the reinforcing fiber bundles (A) exhibits substantially stable values of tan δ' in a range of −25° C. of the melting point of a matrix resin to +25° C. of the melting point of the matrix resin, or in the range of −25° C. of the melting point of a matrix resin to +35° C. of the melting point of the matrix resin. That is, the fiber-reinforced composite material in the present invention exhibits a substantially stable viscoelastic characteristic in a wide temperature range which is the range of −25° C. of the melting point of a matrix resin to +35° C. of the melting point of the matrix resin, or the range of −25° C. of the melting point of a matrix resin to +35° C. of the melting point of the matrix resin, and indicates that the material has a property capable of maintaining material moldability and dimensional accuracy irrespective of the temperature condition within a mold at the time of molding.

Specifically, the viscoelastic characteristic may be controlled by selecting the ratio of the reinforcing fiber bundles (A) in the random mat as a starting material of the fiber-reinforced composite material, or in the fiber-reinforced composite material. Especially, when the ratio of the reinforcing fiber bundles (A) ranges from 20% to 40%, more specifically from 30% to 40%, the material has a relatively high effect of a storage modulus G' with respect to a loss modulus G", and thus it is assumed that at the time of heating the material within a mold, the reinforcing fibers and the matrix resin are required to be slightly flowed to secure formability.

Meanwhile, when the ratio of the reinforcing fiber bundles (A) ranges from 70% or more and less than 90%, the material has a relatively low effect of a storage modulus G' with respect to a loss modulus G", and thus it is assumed that at the time of heating the material within a mold, the reinforcing fibers and the matrix resin are required to be flowed at a predetermined level to suppress unidirectional orientation of the reinforcing fibers, such that the formability into a complicated shape may be secured only while maintaining the isotropy.

[Random Mat]

The fiber-reinforced composite material of the present invention which satisfies a particular viscoelastic characteristic and is constituted by reinforcing fibers and a thermoplastic resin and may be preferably obtained by molding a random mat in which the reinforcing fibers satisfies a specific opening degree. The random mat in which the reinforcing fibers exist at a specific opening degree, specifically includes reinforcing fibers with an average fiber length of 5 mm to 100 mm and a thermoplastic resin, in which the fiber areal weight of the reinforcing fibers ranges from 25 g/m² to 3,000 g/m², the reinforcing fiber bundles (A) constituted by the reinforcing fiber of a critical single fiber number or more defined by the following formula (4) is included in the ratio of 20 Vol % or more and less than 90 Vol % with respect to the total amount of fibers in the mat, and the average number of fibers (N) in the reinforcing fiber bundles (A) satisfies the following formula (5).

Critical single fiber number=600/D (4)

$0.7 \times 10^4/D^2 < N < 1 \times 10^5/D^2$ (5)

(wherein D represents an average fiber diameter (μm) of single reinforcing fibers)

Within a plane of the random mat, the reinforcing fibers are not oriented in a specific direction, but are dispersed and arranged in random directions.

The composite material of the present invention is an in-plane isotropic material. In the shaped product employing the present invention, the ratio of modulus in two perpendicular directions may be obtained to quantitatively evaluate the isotropy of the shaped product. When a ratio obtained by dividing the larger one by the smaller one among modulus values in the two directions of the shaped product is not greater than 2, the product is considered to be isotropic. When the ratio is not greater than 1.3, the product is considered to be excellent in isotropy.

In the random mat, the fiber areal weight of the reinforcing fibers ranges from 25 g/m² to 3,000 g/m². The fiber-reinforced composite material of the present invention obtained from the random mat is useful as a prepreg, and its fiber areal weight may be variously selected according to a required molding.

The random mat that may preferably provide the fiber-reinforced composite material of the present invention includes, as reinforcing fibers, reinforcing fiber bundles (A) constituted by the reinforcing fiber of a critical single fiber number or more defined by formula (4).

Critical single fiber number=600/D (4)

(wherein D represents an average fiber diameter (μm) of single reinforcing fibers)

In the random mat, besides the reinforcing fiber bundles (A), as the reinforcing fibers, reinforcing fibers in a single form and fiber bundles having a single fiber number less than the critical single fiber number are contained.

The ratio of the reinforcing fiber bundles (A) with respect to the total amount of fibers in the mat is preferably 20 Vol % or more and less than 90 Vol %. The lower limit of the existing amount of the reinforcing fiber bundles is preferably 30 Vol %. In order that the existing amount of the reinforcing fiber bundles is 20 Vol % or more and less than 90 Vol %, in the following preferred manufacturing method, for example, the control may be performed by the pressure or the like of air blown in a fiber opening step. Also, the control may be performed by adjusting the size of fiber bundles to be subjected to a cutting step, for example, the bundle width or the number of fibers per width. Specifically, there is a method of widening the width of fiber bundles through extending means or the like and subjecting the fiber bundles to a cutting step, or a method of providing a slitting step before a cutting step. Otherwise, there is a method of cutting fiber bundles by using a so-called fiber separating knife having a plurality of arranged short blades, or a method of simultaneously performing cut and slit. Preferred conditions will be described in the section about the opening step.

Further, in the random mat that may preferably provide the fiber-reinforced composite material of the present invention, the average number of fibers (N) in the reinforcing fiber bundles (A) constituted by the reinforcing fibers of the critical single fiber number or more preferably satisfies the following formula (5).

$$0.7\times10^4/D^2 < N < 1\times10^5/D^2 \quad (5)$$

(wherein D represents an average fiber diameter (μm) of single reinforcing fibers)

Specifically, the average number of fibers (N) in the reinforcing fiber bundles (A) constituted by the reinforcing fibers of the critical single fiber number or more is preferably less than $6\times10^4/D^2$.

In order that the average number of fibers (N) in the reinforcing fiber bundles (A) is within the foregoing range, in the following preferred manufacturing method, the control may be performed by adjusting the size of fiber bundles to be subjected to a cutting step, for example, the bundle width or the number of fibers per width. Specifically, there may be a method of widening the width of fiber bundles through extending means or the like and subjecting the fiber bundles to a cutting step, or a method of providing a slitting step before a cutting step. Otherwise, the fiber bundles may be cut and slit at once.

Also, the average number of fibers (N) in the reinforcing fiber bundles (A) may be controlled by adjusting the degree of opening of the cut fiber bundles through the pressure or the like of air blown in the opening step. Preferred conditions will be described in the sections about the opening step and the cutting step.

Specifically, when the average fiber diameter of the carbon fibers that constitute the random mat ranges from 5 μm to 7 μm, the critical single fiber number ranges from 86 to 120, and when the average fiber diameter of the carbon fibers is 5 the average number of fibers in the fiber bundles is greater than 280 and less than 4,000, and preferably ranges from 600 to 2,500, and more preferably from 600 to 1,600. When the average fiber diameter of the carbon fibers is 7 μm, the average number of fibers in the fiber bundles is greater than 142 and less than 2,040, and preferably ranges from 300 to 1,500, and more preferably from 300 to 800.

The random mat constituted by the reinforcing fibers and the thermoplastic resin as described above, in which the thermoplastic resin exists in a solid phase, and the random mat serves as a preform to obtain the fiber-reinforced composite material of the present invention. The kinds of the thermoplastic resin are as described above. In the random mat, the thermoplastic resin preferably exists in a fibrous and/or particulate form. When the reinforcing fibers mixed with the thermoplastic resin in the fibrous and/or particulate form exist, there is a characteristic that the fibers and the resin are not required to be flowed within a mold, and the thermoplastic resin may be easily impregnated within the reinforcing fiber bundles and between single fibers of the reinforcing fibers at the time of molding. Two or more kinds of thermoplastic resins may be used, and the fibrous form and the particulate form may be used in combination.

In the case of the fibrous form, the fineness ranges from 100 dtex to 5,000 dtex, and more preferably from 1,000 dtex to 2,000 dtex. The average fiber length preferably ranges from 0.5 mm to 50 mm, and more preferably from 1 mm to 10 mm.

The particulate form may preferably employ a spherical, strip or cylindrical (e.g., pellet) shape. The spherical shape may preferably employ a rotating body of a circle or an ellipse, or an egg-like shape. The spherical shape preferably has an average particle diameter ranging from 0.01 μm to 1,000 μm. The average particle diameter more preferably ranges from 0.1 μm to 900 μm, and further more preferably from 1 μm to 800 μm. There is no particular limitation on the distribution of the particle diameter, but for the purpose of obtaining a thinner shaped product, a sharp distribution is more preferred. Meanwhile, by an operation such as classification, a desired particle size distribution may be achieved.

The strip form may employ, as a preferred shape, a cylindrical (e.g., pellet), prismatic or scaly-piece shape, and also may preferably employ a film cut into a rectangular form. In this case, the aspect ratio to some extent may be employed, but the preferred length may be almost the same as that in the fibrous form.

The random mat may include various kinds of fibrous or non-fibrous fillers of an organic fiber, or additives such as a flame retardant, an anti-UV agent, a pigment, a releasing agent, a softening agent, a plasticizer or a surfactant within a limitation that does not impair the object of the present invention.

[Method of Manufacturing Fiber-Reinforced Composite Material]

Hereinafter, a preferred method of obtaining the fiber-reinforced composite material of the present invention will be described. The fiber-reinforced composite material of the present invention may be preferably manufactured by press-molding a random mat constituted by reinforcing fibers and a thermoplastic resin.

That is, the fiber-reinforced composite material of the present invention is preferably manufactured by the following steps (1) to (5):

(1) step of cutting reinforcing fiber bundles;

(2) step of introducing the cut reinforcing fiber bundles into a tube, and opening a fiber bundle by blowing air thereto;

(3) application step of spreading the opened reinforcing fibers and at the same time while suctioning the fibers together with a thermoplastic resin in the fibrous or particulate form to spray the reinforcing fibers and the thermoplastic resin;

(4) step of fixing the applied reinforcing fibers and the applied thermoplastic resin to obtain a random mat; and (5) step of press-molding the obtained random mat. Hereinafter, each step will be described in detail.

[Cutting Step]

Figure 2:
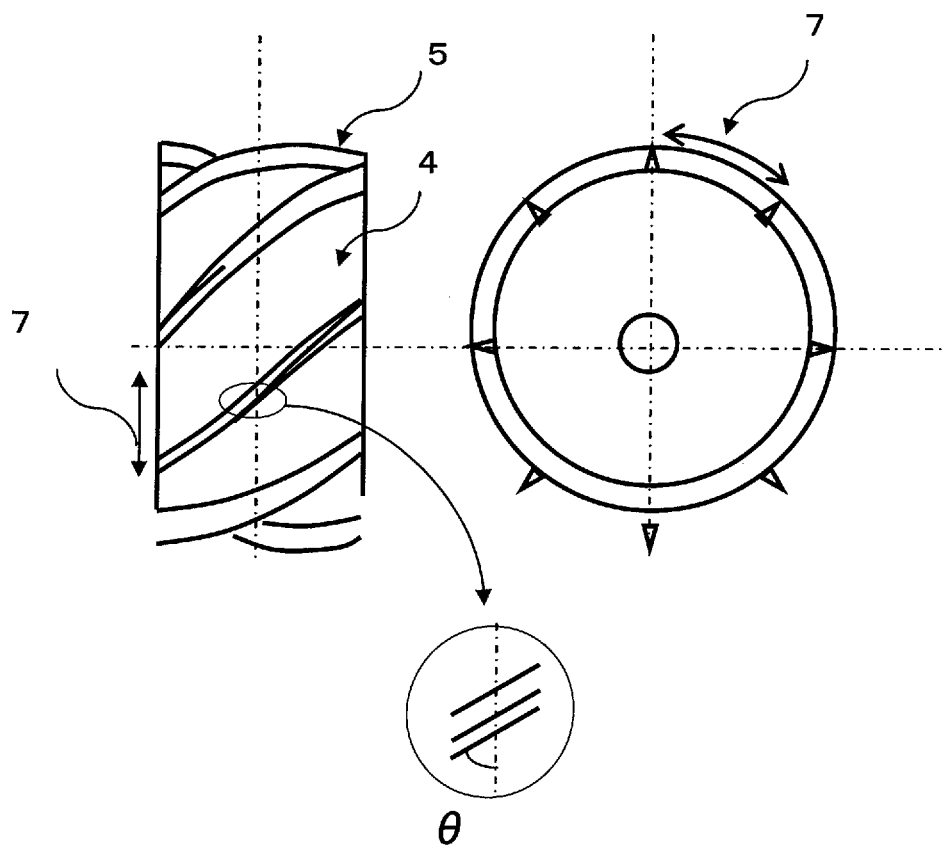
FIG. 2 is a schematic view illustrating a front side and a cross-section of a rotary spiral cutter.
Figure 3:
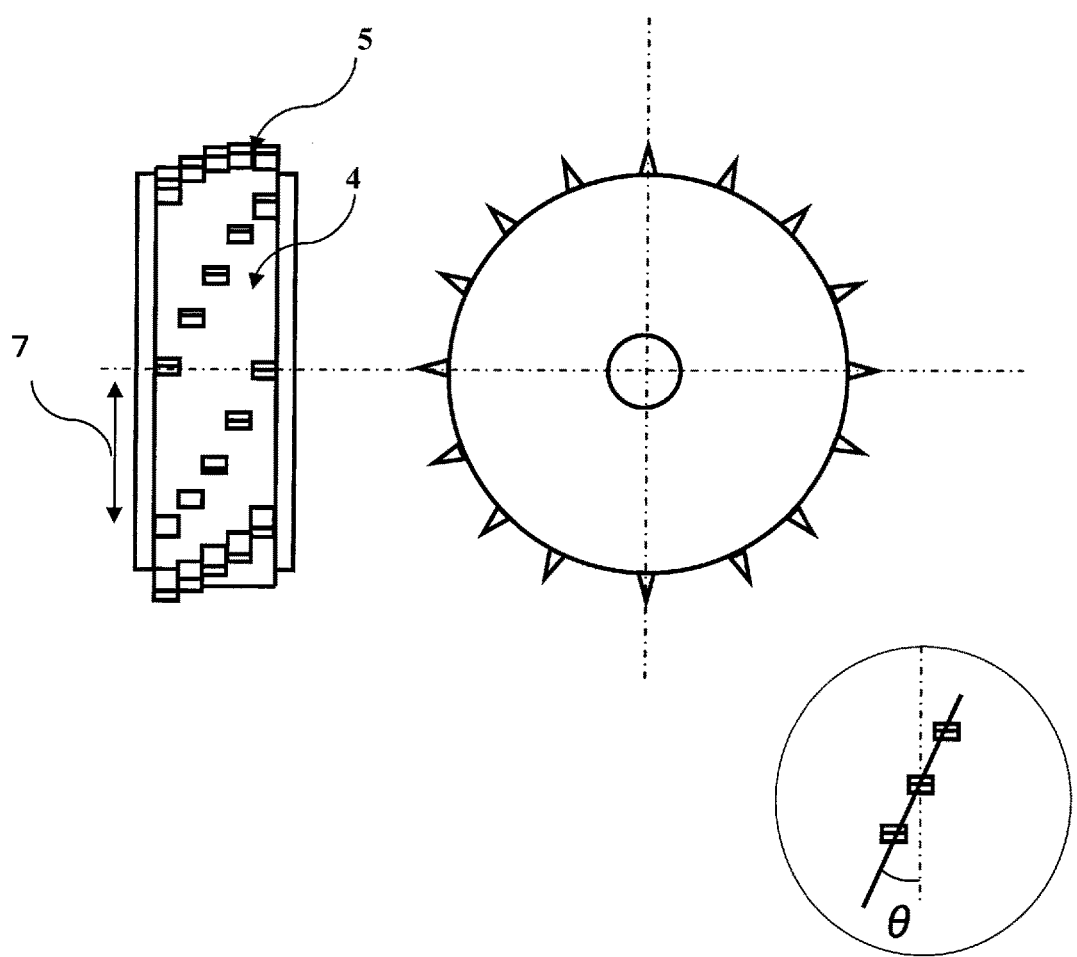
FIG. 3 is a schematic view illustrating a front side and a cross-section of a rotary fiber separating cutter.

In the method of the present invention, a method of cutting the reinforcing fiber specifically includes a step of cutting the reinforcing fiber bundles by using a knife. As for the knife used for the cutting, a rotary cutter or the like is preferred. As for the rotary cutter, a spiral knife, or a so-called fiber separating knife having a plurality of short blades arranged is preferably provided. FIG. 1 illustrates a specific schematic view illustrating the cutting step. FIG. 2 illustrates an example of the rotary cutter having the spiral knife, and FIG. 3 illustrates an example of the rotary cutter having the fiber separating knife.

In order that the average number of fibers (N) in the reinforcing fiber bundles (A) is within the preferred range of the present invention, the control may be performed by adjusting the size of fiber bundles to be subjected to the cutting step, for example, the bundle width or the number of fibers per width.

As the fiber bundle providing to the cutting step, the reinforcing fiber bundle previously having a fiber number within the range of the formula (5) is preferably used. However, in general, as the number of fiber bundles is fewer, the price of the fiber becomes expensive. Therefore, when a reinforcing fiber bundle having a large fiber number which is available at a low cost is used, the width of the fiber bundles to be subjected to the cutting step or the number of fibers per width is preferably adjusted before subjecting the fiber bundles to the cutting step. Specifically, there may be a method of thinly spreading fiber bundles by extending or the like to widen the width of the fiber bundles and then subjecting the fiber bundles to a cutting step, or a method of providing a slit step prior to a cutting step. In the method of providing the slit step, the fiber bundles are thinned in advance, and then are subjected to the cutting step. Thus, as a cutter, a conventional flat blade or spiral blade with no special mechanism may be used.

Also, there may be a method of cutting fiber bundles by using a fiber separating knife, or a method of simultaneously performing cut and slit by using a cutter having a slit function.

In the case of using the fiber separating knife, the average number of fibers (N) may be decreased by using a knife with narrow width thereof, and on the other hand, the average number of fibers (N) may be increased by using a knife with wide width thereof.

Also, as the cutter having the slit function, a fiber separating cutter that has a blade perpendicular to the fiber direction together with a slit-functional blade parallel to the fiber direction may be used.

In obtaining a thermoplastic resin-reinforcing random mat having a good surface appearance, the unevenness in fiber areal weight is highly influential. In a rotary cutter having arranged conventional flat blades, the cutting of fibers is discontinuous. Then, when such cut fibers are subjected to the application step, the unevenness in fiber areal weight occurs. Meanwhile, when knives at a predetermined angle are used to continuously cut the fibers without discontinuance, application with only small unevenness in fiber areal weight may be made. That is, for the purpose of continuously cutting the reinforcing fibers, it is preferred that the knives are regularly arranged at a predetermined angle on the rotary cutter. Also the cutting is preferably made such that the angle of the arranging direction of the blade with respect to the circumferential direction satisfies the following formula (6).

$$\text{Pitch of blades} = \text{reinforcing fiber strand width} \times \tan(90-\theta) \quad (6)$$

(wherein θ represents an angle of the arranging direction of a knife with respect to the circumferential direction)

The pitch of blades in the circumferential direction is, as it is, reflected in the fiber length of the reinforcing fibers.

FIGS. 2 and 3 are examples of a knife at a predetermined angle as described above. In the examples of the cutter, the angle (θ) of the arranging direction of the knife with respect to the circumferential direction is illustrated in the drawings.

[Fiber Opening Step]

The opening step is a step of introducing the cut reinforcing fiber bundles into a tube, and blowing air to the fibers so as to open fiber bundles. The degree of opening, the existing amount of the reinforcing fiber bundles (A), and the average number of fibers (N) in the reinforcing fiber bundles (A) may be appropriately controlled by pressure of air, or the like. In the opening step, air may be directly blown to the fiber bundles from compressed air blowing holes, preferably at a wind speed of 1 m/sec to 1,000 m/sec so as to open the reinforcing fibers. More preferably, the wind speed ranges from 5 m/sec to 500 m/sec. Specifically, a plurality of holes with a size of about Φ1 mm to 2 mm are formed within the tube through which the reinforcing fibers pass, and from the outside, a pressure ranging from 0.01 MPa to 1.0 MPa, and more preferably from 0.2 MPa to 0.8 MPa is applied so as to directly blow the compressed air to the fiber bundles. By lowering the wind speed, it is possible to leave more fiber bundles, while by increasing the wind speed, it is possible to open the fiber bundles up to a single fiber form.

[Application Step]

The application step is a step of spreading the opened reinforcing fibers and at the same time, suctioning the fiber together with the thermoplastic resin in the fibrous or particulate form to spray the reinforcing fibers and the thermoplastic resin. The opened reinforcing fibers and the thermoplastic resin in the fibrous or particulate form are, preferably at the same time, applied on a sheet, specifically on a breathable sheet provided below an opening device.

In the application step, the supply amount of the thermoplastic resin preferably ranges from 50 parts to 1,000 parts by weight based on 100 parts by weight of the reinforcing fibers. The amount of the thermoplastic resin more preferably ranges from 55 parts to 500 parts by weight based on 100 parts by weight of the reinforcing fibers, and further more preferably from 60 parts to 300 parts by weight based on 100 parts by weight of the reinforcing fibers.

Here, the reinforcing fibers and the thermoplastic resin in the fibrous or particulate form are preferably sprayed to be two-dimensionally oriented. In order that the opened fibers are applied to be two-dimensionally oriented, the application method and the following fixing method are important. In the application method of the reinforcing fibers, a tapered tube such as a cone is preferably used. Within the tube of a cone or the like, air is diffused and thus the flow velocity within the tube is decreased, and a rotational force is applied to the reinforcing fibers. By using the Venturi effect, the opened reinforcing fibers may be preferably spread and sprayed.

Also, the following fixing step and the application step may be performed at the same time. That is, the fibers may be fixed while being applied and deposited. It is preferred that the reinforcing fibers and the thermoplastic resin are sprayed on a movable breathable sheet having a suction mechanism, are deposited in a mat shape and are fixed as it is. Here, when the breathable sheet is provided as a conveyor constituted by a net, and is continuously moved in unidirection to allow the fibers and the resin to be deposited thereon, a random mat may be continuously formed. Also, by moving the breathable sheet back and forth and around, uniform deposition may be achieved. Further, it is preferable that a leading edge of the application (spray) unit of the reinforcing fibers and the thermoplastic resin is reciprocated in the direction perpendicular to the moving direction of the continuously moving breathable support so as to continuously perform application and fixation. Here, it is preferable that the reinforcing fibers and the thermoplastic resin are uniformly sprayed in the random mat without unevenness.

[Fixing Step]

The fixing step is a step of fixing the applied reinforcing fibers and the applied thermoplastic resin. Preferably, the fibers are fixed by suctioning air from the bottom of the breathable sheet. Also, the thermoplastic resin that is sprayed together with the reinforcing fibers is mixed, and then fixed by air suction in a case of the fibrous form or together with the reinforcing fibers even in a case of the particulate form.

By suctioning from the bottom through the breathable sheet, a highly two-dimensionally oriented mat may be obtained. Also, the thermoplastic resin in the particulate or fibrous form may be suctioned by using generated negative pressure, and then easily mixed with the reinforcing fibers by the diffusion flow generated within the tube. In the obtained reinforced base material, the thermoplastic resin exists in the vicinity of the reinforcing fibers, and thus the moving distance of the resin in the impregnating step is short, and the impregnation of the resin into the mat for a relatively short time is possible. Also, a breathable non-woven fabric made of the same material as that of the matrix resin to be used may be set on a fixing unit in advance, and the reinforcing fibers and particles may be sprayed on the non-woven fabric.

Through the foregoing preferred method of manufacturing the random mat, a random mat made of fibers orientated two-dimensionally and containing few fibers whose long axes are three-dimensionally oriented may be obtained.

Also, when a random mat is industrially produced, it is preferred that application and fixation are performed while continuously moving the breathable support.

[Press]

Then, the obtained random mat may be press-molded to obtain the fiber-reinforced composite material of the present invention. Here, a plurality of sheets of random mat may be stacked to a required thickness or fiber areal weight and pressed. There is no specific limitation on the method and condition of press-molding, but, specifically, it is preferred that the thermoplastic resin in the random mat is molten under pressure, and is impregnated into the reinforcing fiber bundles and between single fibers of the reinforcing fibers, followed by cooling and molding. Especially, heat-press is preferably performed under a condition of from the melting point to the melting point+80° C. of the matrix thermoplastic resin, or the decomposition temperature or less of the matrix thermoplastic resin. The pressure of press and the time for press may be appropriately selected.

[Fiber-Reinforced Composite Material]

By molding the fiber-reinforced composite material of the present invention, a shaped product which is thin-walled and isotropic, and is excellent in mechanical properties may be obtained. Unlike in conventional stamping molding, in molding of the fiber-reinforced composite material of the present invention, it is not necessary to largely flow fibers and a resin within a mold in a heating step. This suppresses the orientation of the reinforcing fibers in one direction, which improves the mechanical properties and allows a product with a high dimensional accuracy to be produced. Meanwhile, in molding of a complicated three-dimensional shape, especially, a vertical plane existing within a mold is problematic. That is, there is a problem in that when a material is set on a vertical plane within a mold, the material may be slipped down. Also, there is a problem in that in a case where a material is set on a vertical portion in advance, when an upper mold is slid toward a lower mold, the material on the vertical portion quickly comes in contact with the mold as compared to a material set on a flat portion, and thus the material on the flat portion may not be sufficiently pressurized. Especially, when the height of the vertical plane is large, the problem becomes significant. Thus, in order to manufacture a shaped product in a complicated shape, it is necessary to flow a material at a predetermined level. The fiber-reinforced composite material of the present invention has a particular viscoelastic characteristic, and thus it is possible to flow the reinforcing fibers and the matrix resin at a predetermined level. Thus, there is a characteristic in that even after flowing, isotropy of the obtained shaped product of the fiber-reinforced composite material is maintained, and thus a product with a high mechanical property may be dimensionally accurately obtained. Further, by flowing the reinforcing fibers and the matrix resin within a mold, a thin-walled matter may be preferably molded.

In this manner, for example, a plate-like fiber-reinforced composite material may be efficiently obtained in a short time. The plate-like fiber-reinforced composite material is also useful as a prepreg for three-dimensional molding, especially, a prepreg for press-molding. Specifically, a shaped product may be obtained by a so-called cold press, in which the plate-like fiber-reinforced composite material is heated up to a melting point of the resin or more or a glass transition point of the resin or more, and the heated material as a single sheet or a plurality of stacked sheets in accordance with the shape of a required shaped product is introduced into a mold kept at a temperature of less than a melting point of the resin or less than a glass transition point of the resin, pressurized, and cooled.

Otherwise, a shaped product may be obtained by a so-called hot press, in which a plate-like fiber-reinforced composite material is introduced into a mold, and heated up to a melting point of the resin or more or a glass transition point of the resin or more, while being subjected to press-molding, and subsequently, the mold is cooled to less than a melting point of the resin or less than a glass transition temperature of the resin.

The fiber-reinforced composite material of the present invention is a material in which an elastic component is substantially dominant in the deformation characteristic of the composite material.

EXAMPLES

Hereinafter, Examples will be described, but the present invention is not limited thereto.

1) Analysis of Reinforcing Fiber Bundles in Random Mat

A random mat is cut into a size of about 100 mm×100 mm.

From the cut mat, all of fiber bundles are extracted by tweezers, the number of bundles (I) of reinforcing fiber bundles (A), and the length (Li) and the weight (Wi) of the fiber bundles are measured and recorded. Some fiber bundles which are too small to be extracted by the tweezers are lastly weighed in a mass (Wk). For the measurement of the weight, a balance capable of measuring to 1/100 mg is used. Based on the fiber diameter (D) of reinforcing fibers used for the random mat, a critical single fiber number is calculated, by which reinforcing fiber bundles (A) constituted by the reinforcing fibers of the critical single fiber number or more and others are separated from each other. Also, when two or more kinds of reinforcing fibers are used in combination, the fibers are divided into respective kinds, and the respective kinds of fibers are separately measured and evaluated.

Hereinafter, the method of obtaining the average number of fibers (N) of the reinforcing fiber bundles (A) will be described.

The number of fibers (Ni) in each reinforcing fiber bundle may be obtained from the fineness (F) of the reinforcing fibers in use by the following formula.

$$Ni=Wi/(Li \times F)$$

The average number of fibers (N) in the reinforcing fiber bundles (A) may be obtained from the number of bundles (I) of the reinforcing fiber bundles (A) by the following formula.

$$N=\Sigma Ni/I$$

The ratio (VR) of the reinforcing fiber bundles (A) with respect to the total amount of fibers in the mat may be obtained by the following formula by using the density ($\rho$) of the reinforcing fibers.

$$VR=\Sigma(Wi/\rho) \times 100/((Wk-\Sigma Wi)/\rho)$$

2) Analysis of Reinforcing Fiber Bundles in Fiber-Reinforced Composite Material

In the fiber-reinforced composite material, after the resin is removed within a furnace at 500° C. for about 1 hour, measurement is performed in the same manner as in the foregoing random mat.

3) Analysis of Average Fiber Length of Reinforcing Fibers Included in Random Mat or Composite Material The lengths of 100 reinforcing fibers randomly extracted from the random mat or the composite material were measured to a unit of 1 mm by using a vernier caliper or a loupe and recorded. From all of the measured lengths (Li) of the reinforcing fibers, the average fiber length (La) was obtained by the following formula. In a case of the composite material, after the resin was removed within a furnace at 500° C. for about 1 hour, the reinforcing fibers were extracted.

$$La=\Sigma Li/100$$

4) Analysis of Fiber Orientation in Composite Material

In a method of measuring isotropy of fibers after the molding of the composite material, a tension test is performed based on an arbitrary direction of a molded plate, and its perpendicular direction to measure a tensile modulus, and then among the measured values of the tensile modulus, a ratio (E$\delta$) obtained by dividing the larger one by the smaller one is measured. When the ratio of the elastic modulus is close to 1, the material is excellent in isotropy. In the present Examples, when the ratio of the elastic modulus is 1.3 or less, the material is evaluated to be excellent in isotropy.

5) Measurement of Viscoelastic Characteristic

A sample was processed into a diameter of 25 mm, and a thickness of 1 mm. A dynamic analyzer RDA-ii (TA Instruments Japan) was used to measure a viscoelastic characteristic, G' and G", according to the response when strain is periodically given to the sample interposed between two parallel plates. Then, tan $\delta$ was obtained by the following formula.

$$\tan \delta' = G''/G' \qquad (1)$$

$$\tan \delta' = Vf \times \tan \delta/(100-Vf) \qquad (2)$$

(wherein G' represents a storage modulus (Pa) of the fiber-reinforced composite material, G" represents a loss modulus (Pa) of the fiber-reinforced composite material, and Vf represents a volume fraction (%) of the reinforcing fibers in the fiber-reinforced composite material)

The measurement order is as follows. By taking the effect of linear expansion of the device itself into account, at 230° C. (in the middle of measurement temperature ranging from 200° C. to 260° C.), zero point between parallel plates in distance was adjusted, the sample provided between the parallel plates was heated up to 260° C., which is a melting point or more, and then the parallel plates were adhered to the sample (a melting point of nylon 6 is 225° C.). Here, when the clearance is varied, there is a concern that the structure of the carbon fibers within the parallel plates may be varied. Thus, while the clearance was fixed, the measurement was performed at a load strain of 0.1%, and a frequency of 1 Hz, by lowering the temperature from 260° C. to 200° C.

Example 1

As reinforcing fibers, carbon fibers "TENAX" (trademark) STS40-24KS (average fiber diameter: 7 μm, tensile strength: 4,000 MPa, fiber width: 10 mm) manufactured by TOHO TENAX Co., Ltd were used. As for a cut device, as illustrated in FIG. 2, a rotary cutter with a diameter of 150 mm was used in which spiral knives made of cemented carbide were disposed on the surface.

Here, in the following formula (6), θ was 55°, and the pitch of blades was 20 mm, by which the reinforcing fibers were cut into a fiber length of 20 mm.

$$\text{Pitch of blades} = \text{reinforcing fiber strand width} \times \tan(90-\theta) \qquad (6)$$

(wherein θ represents an angle of the arranging direction of a knife with respect to the circumferential direction.)

As for an opening device, a double tube was manufactured by welding nipples made of SUS304 which have different diameters. Small holes were provided in the inner tube such that compressed air was supplied by a compressor between the inner tube and the outer tube. Here, the wind speed from the small holes was 450 m/sec. This tube was disposed just below the rotary cutter, and below it, a tapered tube was welded. From the side surface of the tapered tube, a nylon resin "A1030" (manufactured by Unitika Limited) was supplied as a matrix resin such that the volume fraction (Vf) of the carbon fibers was 30 Vol %.

Then, a table capable of moving in XY directions was provided below the outlet of the tapered tube, and suction from the bottom of the table was performed by a blower. After the supply amount of the reinforcing fibers was set to 110 g/min, and the supply amount of the matrix resin was set to 253 g/min, the device was operated to obtain a random mat including the reinforcing fibers mixed with the thermoplastic resin. When the form of the reinforcing fibers on the random mat was observed, the fiber axis of the reinforcing fibers was substantially parallel to the plane, and randomly dispersed in the plane. In the obtained random mat, the average fiber length of the reinforcing fibers was 20 mm, the resin was included in an amount of 230 parts by weight based on 100 parts by weight of carbon fibers, and the fiber areal weight of the reinforcing fibers was 420 g/m².

On the obtained random mat, when the ratio of the reinforcing fiber bundles (A), and the average number of fibers (N) were investigated, the critical single fiber number defined by formula (I) was 86, the ratio of the reinforcing fiber bundles (A) with respect to the total amount of the fibers in the mat was 30%, and the average number of fibers (N) in the reinforcing fiber bundles (A) was 240. Also, nylon powder was dispersed in the reinforcing fibers without significant unevenness.

The three sheets of obtained random mat were heated at 1 MPa for 3 minutes by a press device heated up to 260° C. so as to obtain a molded plate with a material thickness of 1.0 mm, that is, the fiber-reinforced composite material of the present invention. When the obtained molded plate was subjected to an ultrasonic detection test, a non-impregnated section or a void was not detected.

On the obtained molded plate, when the viscoelastic characteristic (G', G" and tan δ) was measured, the average value of tan δ' in a range of −25° C. of the melting point of a matrix resin to +25° C. of the melting point of the matrix resin was 0.013. The average value of tan δ' in a range of −25° C. of the melting point of a matrix resin to +35° C. of the melting point of the matrix resin was 0.012. FIG. 4 shows the measurement results of tan δ' at a temperature of 200° C. to 260° C.

The thickness dimension of the obtained shaped product was 1.05 mm. Thus, it was possible to obtain the shaped product formed in a thin plate, in which the increase in thickness was only 5% compared to a predetermined thickness. Also, when tensile modulus in the directions of 0° and 90° of the obtained molded plate were measured, the ratio (Eδ) of moduli was 1.03. That is, it was possible to obtain a molded plate in which fiber orientation hardly occurred, and isotropy was maintained. When the molded plate was heated within a furnace at 500° C. for about 1 hour to remove the resin, the average fiber length of the reinforcing fibers was measured as 20 mm. After the resin was removed from the molded plate, the ratio of the reinforcing fiber bundles (A) and the average number of fibers (N) were investigated. Here, the ratio of the reinforcing fiber bundles (A) with respect to the total amount of fibers was 30%, the average number of fibers (N) in the reinforcing fiber bundles (A) was 240, and these measurement results were not different from those in the random mat.

Example 2

A random mat having carbon fibers in a volume fraction (Vf) of 30 Vol % was obtained in the same manner as in Example 1, except that carbon fibers "TENAX" (trademark) STS40-24KS (fiber diameter: 7 μm, tensile strength: 4000 MPa) manufactured by TOHO TENAX Co., Ltd were used as reinforcing fibers, and a nylon resin "A1030" (manufactured by Unitika Limited) was used as a matrix resin, and spray was performed at a wind speed of 150 m/sec from small holes of an opening device. When the form of the reinforcing fibers on the random mat was observed, the fiber axis of the reinforcing fibers was substantially parallel to the plane, and randomly dispersed in the plane. In the obtained random mat, the average fiber length of the reinforcing fibers was 20 mm. On the obtained random mat, when the ratio of the reinforcing fiber bundles (A), and the average number of fibers (N) were investigated, the critical single fiber number defined by formula (I) was 86, the ratio of the reinforcing fiber bundles (A) with respect to the total amount of the fibers in the mat was 70%, and the average number of fibers (N) in the reinforcing fiber bundles (A) was 900.

From the obtained random mat, a molded plate, which is the fiber-reinforced composite material of the present invention, was obtained in the same manufacturing method as in Example 1. On the obtained molded plate, when the viscoelastic characteristic (G', G" and tan δ) was measured, the average value of tan δ' in a range of −25° C. of the melting point of a matrix resin to +25° C. of the melting point of the matrix resin was 0.119. The average value of tan δ' in a range of −25° C. of the melting point of a matrix resin to +35° C. of the melting point of the matrix resin was 0.117. FIG. 5 shows the measurement results of tan δ' at a temperature of 200° C. to 260° C.

The thickness dimension of the obtained shaped product was 1.00 mm. That is, it was possible to obtain a thickness dimension corresponding to a required design value. Also, when tensile modulus in the directions of 0° and 90° of the obtained molded plate were measured, the ratio (Eδ) of moduli was 1.04. That is, it was possible to obtain a molded plate in which fiber orientation hardly occurred, and isotropy was maintained. When the molded plate was heated within a furnace at 500° C. for about 1 hour to remove the resin, the average fiber length of the reinforcing fibers was measured as 20 mm. After the resin was removed from the molded plate, the ratio of the reinforcing fiber bundles (A) and the average number of fibers (N) were investigated. Here, the ratio of the reinforcing fiber bundles (A) with respect to the total amount of fibers was 70%, the average number of fibers (N) in the reinforcing fiber bundles (A) was 900, and these measurement results were not different from those in the random mat.

Comparative Example 1

A random mat was manufactured in the same manner as in Example 1 except that the wind speed from small holes was set to 50 m/sec. When the form of the reinforcing fibers on the random mat was observed, the fiber axis of the reinforcing fibers was substantially parallel to the plane, and randomly dispersed in the plane. The average fiber length of the reinforcing fibers was 20 mm. On the obtained random mat, when the ratio of the reinforcing fiber bundles (A), and the average number of fibers (N) were investigated, the critical single fiber number defined by formula (I) was 86, the ratio of the reinforcing fiber bundles (A) with respect to the total amount of fibers of the mat was 95%, and the average number of fibers (N) in the reinforcing fiber bundles (A) was 1500.

In the obtained random mat, the reinforcing fiber bundles were thick. When the random mat was manufactured into a molded plate in the same manner as in Example 1, and the molded plate was subjected to an ultrasonic detection test, a non-impregnated section was detected. Also, when the molded plate was cut and the cross-section was observed, the portion within the fiber bundles in which the resin was not impregnated was found.

Figure 6:
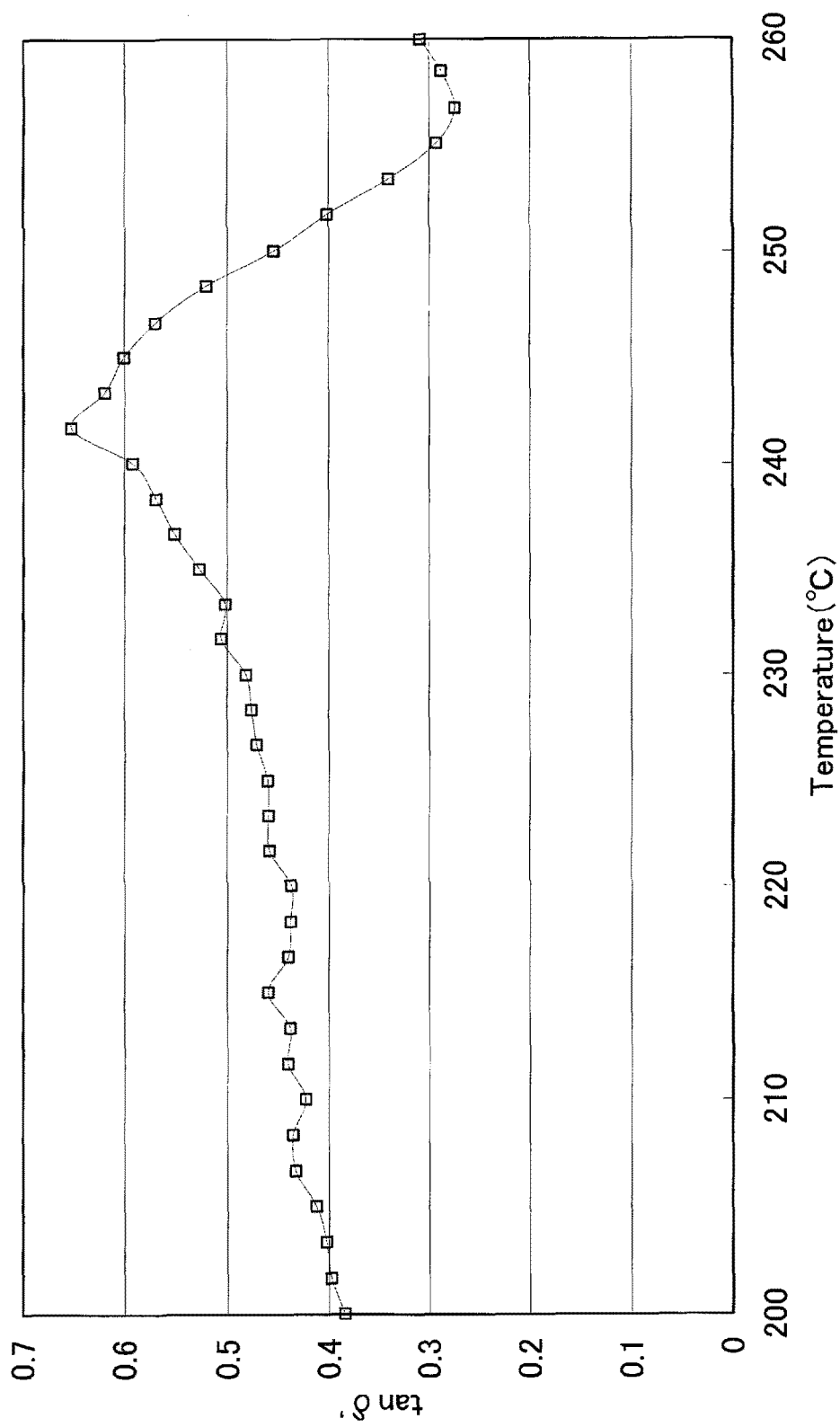
FIG. 6 shows measurement results of tan δ' in a fiber-reinforced composite material of Comparative Example 1.

The obtained random mat was heated at a pressure increased up to 4 MPa for 3 minutes by a press device heated up to 260° C. so as to obtain a molded plate. The obtained molded plate had a widened area that was about twice the area of the mat, and had a thickness of about 0.3 mm that was about half the thickness of the mat. On the obtained molded plate, it was possible to confirm the flow of fibers with eyes. When tensile modulus in a flow direction and in a direction of 90° to the flow was measured, the ratio (Eδ) of moduli was 2.33, and fiber orientation was confirmed to largely occur. When the molded plate was heated within a furnace at 500° C. for about 1 hour to remove the resin, the average fiber length of the reinforcing fibers was measured as 20 mm. After the resin was removed from the molded plate, the ratio of the reinforcing fiber bundles (A) and the average number of fibers (N) were investigated. Here, the ratio of the reinforcing fiber bundles (A) with respect to the total amount of fibers was 95%, the average number of fibers (N) in the reinforcing fiber bundles (A) was 1500, and these measurement results were not different from those in the random mat. On the obtained molded plate, when the viscoelastic characteristic (G', G" and tan δ) was measured, the average value of tan δ' in a range of −25° C. of the melting point of a matrix resin to +25° C. of the melting point of the matrix resin was 0.48. The average value of tan δ' in a range of −25° C. of the melting point of a matrix resin to +35° C. of the melting point of the matrix resin was 0.46. FIG. 6 shows the measurement results of tan δ' at a temperature of 200° C. to 260° C.

DESCRIPTION OF NUMERALS

1: reinforcing fiber
2: pinch roller
3: rubber roller
4: rotary cutter main body
5: blade
6: cut reinforcing fiber
7: pitch of blades

The invention claimed is:

1. A fiber-reinforced composite material comprising:
reinforcing fibers with a fiber length of 5 mm to 100 mm; and
a thermoplastic resin,
wherein in tan δ' that exhibits a viscoelastic characteristic as defined by formulas (1) and (2), an average value of the tan δ' in a range of −25° C. to +25° C. of a melting point of a matrix resin satisfies formula (3):

$$\tan \delta = G''/G' \tag{1}$$

$$\tan \delta' = V\!f \times \tan \delta / (100 - V\!f) \tag{2}$$

$$0.01 \leq \tan \delta' \leq 0.2 \tag{3}$$

wherein G' represents a storage modulus (Pa) of the fiber-reinforced composite material,
G" represents a loss modulus (Pa) of the fiber-reinforced composite material, and
Vf represents a volume fraction (%) of the reinforcing fibers in the fiber-reinforced composite material;
wherein the reinforcing fibers in the fiber-reinforce composite material are carbon fibers and the carbon fibers includes a reinforcing fiber bundle (A) constituted by the carbon fibers of a critical single fiber number or more, the critical single fiber number defined by formula (4), and a reinforcing fiber bundle constituted by the carbon fibers less than the critical single fiber number:

$$\text{Critical single fiber number} = 600/D \tag{4}$$

wherein D represents an average fiber diameter (μm) of single carbon fibers;
the carbon fibers are two-dimensionally oriented; and
the carbon fibers are deposited in a mat form.

2. The fiber-reinforced composite material according to claim 1,
wherein the thermoplastic resin is at least one kind selected from the group consisting of a polyamide 6 resin and a polypropylene resin.

3. The fiber-reinforced composite material according to claim 1,
wherein a content of the thermoplastic resin is 50 parts to 1000 parts by weight based on 100 parts by weight of the reinforcing fibers.

4. The fiber-reinforced composite material according to claim 1,
wherein the reinforcing fibers have an average fiber length of 10 mm to 100 mm.

5. The fiber-reinforced composite material according to claim 1,
wherein a ratio of the reinforcing fiber bundle (A) constituted by the reinforcing fibers of a critical single fiber number or more, to a total amount of the reinforcing fibers in the fiber-reinforced composite material is 20 Vol % or more and less than 90 Vol %.

6. The fiber-reinforced composite material according to claim 5,
wherein the ratio of the reinforcing fiber bundle (A) constituted by the reinforcing fibers of the critical single fiber number or more, to the total amount of the reinforcing fibers in the fiber-reinforced composite material is from 20 Vol % to 40 Vol %.

7. The fiber-reinforced composite material according to claim 5,
wherein the ratio of the reinforcing fiber bundle (A) constituted by the reinforcing fibers of the critical single fiber number or more, to the total amount of the reinforcing fibers in the fiber-reinforced composite material is from 70 Vol % to 90 Vol %.

* * * * *